United States Patent [19]

Heinz et al.

[11] 4,251,411

[45] Feb. 17, 1981

[54] PROCESS FOR THE MANUFACTURE OF ORGANIC POLYMER POLYOL

[75] Inventors: Gerhard Heinz, Weisenheim; Hermann Dikow, Hockenheim; Wolfgang Jarre, Ludwigshafen; Dietmar Nissen, Heidelberg; Klaus Matthias, Viernheim; Hanshelmut Kaeppel, Weinheim, all of Fed. Rep. of Germany

[73] Assignee: BASF Aktiengesellschaft, Ludwigshafen, Fed. Rep. of Germany

[21] Appl. No.: 941,285

[22] Filed: Sep. 11, 1978

[30] Foreign Application Priority Data

Sep. 9, 1977 [DE] Fed. Rep. of Germany ....... 2740672

[51] Int. Cl.$^3$ ................................................ C08K 5/05
[52] U.S. Cl. .................................. 260/29.6 E; 521/67
[58] Field of Search ................. 260/29.6 E, 29.6 ME, 260/29.6 WQ, 29.7 E, 29.2 TN, 859 R; 521/67, 137

[56] References Cited

U.S. PATENT DOCUMENTS

| | | | |
|---|---|---|---|
| 3,314,901 | 4/1967 | Daumiller | 260/859 R |
| 3,869,413 | 3/1975 | Blankenship | 521/137 |
| 4,049,590 | 9/1977 | Falkenstein | 521/137 |
| 4,093,573 | 6/1978 | Ramlow | 521/137 |
| 4,122,056 | 10/1978 | Ramlow | 260/29.6 ME |

*Primary Examiner*—Paul R. Michl
*Attorney, Agent, or Firm*—Norbert M. Lisicki

[57] ABSTRACT

A process for the manufacture of partially dehydrated organic polymer polyol dispersions from the reaction of polyhydroxyl compounds and aqueous polymer dispersions wherein the problem of excessive viscosity is overcome by mixing the reactants with a recycled partially dehydrated polyol polymer dispersion, removing water from the reaction mixture, removing a portion of the partially dehydrated polyol polymer dispersion, and recycling the remainder.

3 Claims, 1 Drawing Figure

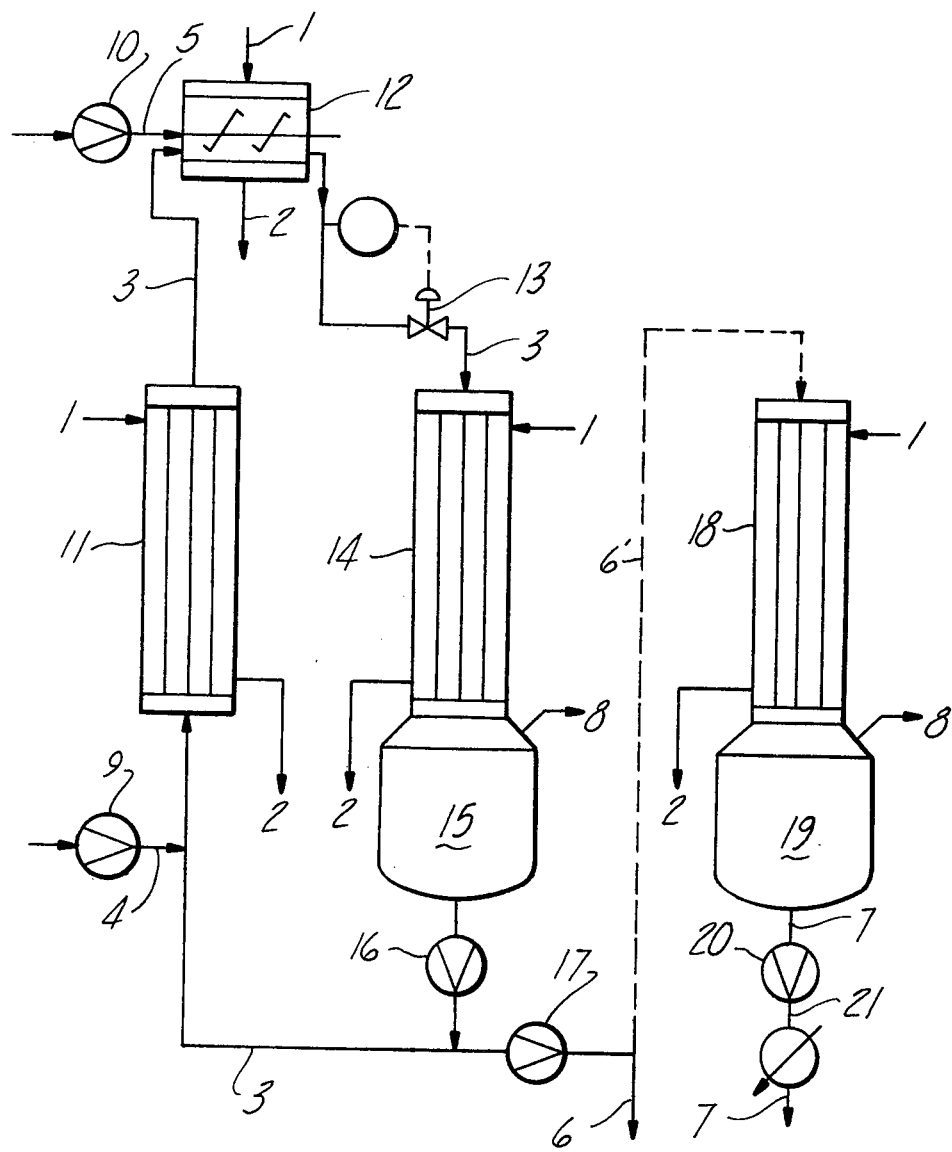

PROCESS FOR THE MANUFACTURE OF ORGANIC POLYMER POLYOL

BACKGROUND OF THE INVENTION

1. Field of the Invention

The present invention relates to a process for the manufacture of organic polymer polyol dispersions having a water content of 0.2 to 5 percent by weight by dehydration of the reaction products of polyhydroxyl compounds and aqueous polymer dispersions.

2. Description of the Prior Art

By mixing organic polyhydroxyl compounds with aqueous polymer dispersions having solids contents of 20 to 65% by weight relative to the total weight in weight ratios of 1 to 0.05 to 1 to 2, aqueous polymer polyol dispersions having viscosities of 5 to 5,000 Pas are formed. Due to the resulting great viscosity, the complete mixing of the raw materials is either not possible, or possible only after long, intensive stirring requiring considerable energy. Also because of decreased viscosity of the mixture, the water only slowly diffuses to the liquid surface in order to evaporate. In the case of non-homogeneous mixtures, the separation of the water results in a coagulation of the batch. Coagulation also is frequently incurred with large batches in commonly used mixing vessels due to the prolonged temperature stress.

SUMMARY OF THE INVENTION

The purpose of this invention is to carefully separate water from mixtures of organic polyhydroxyl compounds in aqueous polymer dispersions and to produce polymer polyol dispersions in high space time yields having water contents of less than 5 percent by weight relative to the total weight with the maximum viscosity of the mixtures being 10 Pas.

The purpose of this invention was surprisingly met by a process for the manufacture of organic polymer dispersions from polyhydroxy compounds and aqueous polymer dispersions, comprising the steps of (a) mixing a polyhydroxy compound and an aqueous polymer dispersion in a reaction medium containing a recycled partially dehydrated polyol polymer dispersion wherein the weight ratio of introduced polyhydroxyl compound to the introduced aqueous polymer dispersion is 1:0.5 to 1:2, (b) removing water from the mixture in an amount sufficient to provide a water content of 0.2 to 5 percent by weight based on the total weight of the mixture, (c) removing a portion of the polymer polyol dispersion obtained, and (d) recycling the remaining portion of the polymer polyol dispersion obtained with the weight ratio of the recycled polyol dispersion to the removed polyol polymer dispersion being from 40:1 to 1:2.

The discharged polymeric polyol dispersion is preferably dehydrated to a water content of 0.01 to 0.3 percent by weight relative to the total weight in one to two additional dehydration stages.

Surprisingly it was found that by incorporating mixtures of polyhydroxyl compounds and aqueous polymer dispersions in the above referenced quantity ratios in already partially dehydrated polymer polyol dispersions, the viscosities depending upon the type of the polyhydroxyl compound and the aqueous polymer dispersion used is reduced from originally 5 to 50,000 Pas to 0.2 to 10 and usually 0.5 to 5 Pas, that is by at least the factor of 10 and usually 10 to 1,000.

BRIEF DESCRIPTION OF THE DRAWING

In the accompanying drawing, the single FIGURE represents typical apparatus that may be used to carry out the processes of the invention.

DESCRIPTION OF THE PREFERRED EMBODIMENTS

The following should be noted concerning the polyhydroxyl compounds and aqueous polymer dispersions useable as starting components for the manufacture of organic polymer polyol dispersions:

Initially it should be said that the referenced polyhydroxyl compounds and polyols are the same compounds. The differing definition was chosen in order to better describe the process according to the invention where the freshly added polyhydroxy compound after the partial separation of the water and the resulting organic dispersion are referred to as polyols.

Suitable polyhydroxy compounds and/or polyols are, for instance, polyacetals, aliphatic polycarbonates, polyester amides, polyesters and preferably polyalkylene ethers containing linear and/or branched hydroxyl groups.

Polyesters containing hydroxyl groups are produced for instance from multivalent preferably bivalent carboxylic acids such as adipic acid, sebacic acid, phthalic acid, halogenated phthalic acids, maleic acids, fatty acids, and/or their derivates such as anhydrides and esters with low molecular alcohols and multivalent alcohols such as ethylene glycol, polyethylene glycols, propylene glycols, polypropylene glycols, butanediol, hexanetriol, glycerine and so forth. Preferably used, however, are hydroxyl group containing polyethers which are obtained by reaction of one or more alkylene oxides with two to four carbon atoms in the alkylene radical with a starter molecule which contains at least two active hydrogen atoms. Suitably alkylene oxides include tetrahydrofuran, epichlorohydrin, 1,2- and 2,3-butylene oxide and preferably ethylene oxide and 1,2-propylene oxide. The alkylene oxides may be used individually, alternatingly in sequence or as mixtures. Possible starter molecules are water, phosphoric acid, amines such as ammonium, hydrazine, ethylenediamine, hexamethylenediamine, toluene diamine, diaminodiphenolmethane, and melamine; amino alcohols such as mono- and diethanolamines; polycarboxylic acids such as adipic acids, and terephthalic acid and di- and multivalent alcohols such as ethylene glycol, propylene glycol, diethylene glycol, glycerine, trimethylolpropane, pentaerythritol, sorbitol and sucrose. Such hydroxyl group containing polyethers are produced according to familiar processes, for instance, analogous to the data provided in the German publication DT-OS No. 2,220,723, page 4.

The hydroxyl number of the polyhydroxyl compounds used may vary within a wide range. Generally the hydroxyl number of the polyhydroxyl compounds used in accordance with this invention are within the range of approximately 20 and below up to approximately 1,000 and above, preferably between approximately 20 to approximately 600, and particularly between approximately 25 to approximately 450.

The hydroxyl number is defined as the number of milligrams of potassium hydroxide which is required for the complete hydrolysis of the completely acetylated derivate produced from one gram of polyhydroxyl compound. The hydroxyl number can also be defined by the following equation:

$$OH = 56.1 \times 1,000 \times f/M$$

In this equation:
OH stands for the hydroxyl number of polyhydroxyl compound
f represents the functionality that is the average number of hydroxyl groups per molecule of polyhydroxyl compound, and
M stands for the molecular weight of the polyhydroxyl compound.

Which polyhydroxyl compound is used in the respective case depends on the final application of the polyurethane products to be produced from the compounds. The molecular weight or the hydroxyl number is chosen in such a manner that flexible, semi-flexible or rigid foams or elastomers are obtained when the polymer polyol dispersions produced from the polyhydroxyl compound is used for a polyurethane foam. If the polyhydroxyl compounds are used for rigid foams, the preferred hydroxyl number is approximately 200 to approximately 1,000; if the compounds are used for semi-flexible foams, the hydroxyl number is between approximately 30 to approximately 150; and if used for the manufacture of flexible foams, the hydroxyl number is approximately 20 to approximately 70 or more. These limits do not at all restrict the current invention but they are used only to explain the large number of possible combinations of the polyhydroxyl compounds.

The aqueous polymer dispersions to be used in accordance with this invention have solids contents of 20 to 65 percent by weight, preferably 40 to 65 percent by weight relative to the total weight and are produced by familiar processes such as solution or suspension polymerization, and preferably by emulsion polymerization.

The emulsion polymerization in aqueous media is commonly carried out at temperatures between 30° and 100° C. generally in the presence of emulsifiers such as alkali salts, in particular sodium salts of alkyl or alkylarylsulfonate, alkyl sulfates, fatty alcohol sulfonates or fatty acids with 10 to 30 carbon atoms with sodium salts of alkyl sulfonates or fatty acids with 12 to 18 carbon atoms being preferred as emulsifiers. In general, the emulsifiers are used in quantities of 0.3 to 5 and in particular from 1.0 to 2.0 percent by weight relative to the monomers. If required, commonly used buffer salts such as sodium bicarbonate and sodium pyrophosphates are also used.

By the same token, the commonly used polymerization initiators such as persulfates or organic peroxides combined, if necessary, with reducing agents may be utilized. The weight ratio of water to monomers is preferably between 1.5 to 1 and 0.7 to 1 and the polymerization is preferably continued until a nearly complete reaction, that is more than 90 percent and in particular more than 96 percent of the monomers, has been attained. The size of the latex particles can be varied by familar methods such as inoculation, emulsifier concentration, staggered emulsifier addition, liquor ratio, emulsion feed and addition of agglomerating agents. The particle size (diameter) may be between 500 and 5,000 angstroms, preferably however a polymer having a medium particle size ($d_{50}$-value of mass distribution) is used which can be determined by counting out with electron microscopes or by altered centrifuge methods. These particles are between 1,000 and 4,000 angstroms. The unit measure "$d_{50}$-value" means that 50 percent of the mass of the polymer particles have a diameter above the $d_{50}$ value and correspondingly 50 percent of the mass of the polymer particles have a diameter below the $d_{50}$ value. The breadth of the mass distribution of the dispersed polymer particles can vary within wide limits. Preferably, however, those polymer dispersions are used where at least 20 percent of the mass of the polymer particles have a diameter between 1,000 and 4,000 angstroms.

Suited for the manufacture of the aqueous polymer dispersions are cross-linked fine particle homo- and copolymerizates which contain either no or preferably at least one group which is reactive with isocyanates such as OH, $NH_2$, NH, COOH, $CONH_2$ groups or the like. These homo- and copolymerizates are produced in a familiar manner from corresponding polymerizable olefinic unsaturated monomers.

Possible monomers which contain groups which are reactive with isocyanates and which serve as building components for the homo- and copolymerizates, include unsaturated polymerizable alcohols such as vinyl glycol, butene-2-diol-1,4 butanol and allyl alcohol, esters of unsaturated carboxylic acids such as acrylic acid or substituted acrylic acids, crotonic acid, fumaric acid, itaconic acid, straight or branched chains with possibly either group containing multivalent alcohols particularly di- and triols with average molecular weights of 50 to 6,000, preferably 50 to 2,000 where at least one OH group of the multivalent alcohols is not esterified, unsaturated copolymerizable polyols with average molecular weights of 200 to 6,000, preferably 500 to 2,000, amides of unsaturated carboxylic acids such as acrylamide, methacrylamide, or other derivates which are reactive with NCO groups and/or unsaturated mono- or dicarboxylic acids such as acrylic acid, methacrylic acid, fumaric acid, among others or their mixtures.

These monomers containing groups which are reactive with isocyanates can be used individually or as a mixture with other polymerizable monomers which do not contain these reactive groups to produce the homo- and copolymerizates.

Suitable monomers which do not contain groups reactive with isocyantes include vinyl aromatics such as styrene, alpha-alkylated styrene such as alpha-methylstyrene, ring substituted styrenes such as vinyl toluene, o- and p-ethyl styrene and t-butyl styrene, halogen substituted styrenes such as o-chlorostyrene, 2,4-dichlorostyrene, and o-bromostyrene, olefinic unsaturated nitriles such as acrylonitrile and methacrylonitrile, vinyl halides such as vinyl chloride, vinylidene chloride and vinyl bromide, vinyl esters of alpha or beta unsaturated carboxylic acids such as esters of acrylic acid, methacrylic acid, crotonic acid, maleic, fumaric, itaconic acid, containing monoalcohols with 1 to 10 carbon atoms such as methyl, ethyl, propyl, i-propyl, n-butyl, i-butyl, tertiary butyl, hexyl, octyl, 2-ethylhexyl, and lauryl acrylates and/or methacrylates. Mixtures of such vinyl compounds are also suitable.

If required, the homo- and copolymerizates can be partially cross-linked and may have a gel content of more than 5 percent, preferably of 30 to 100 percent. The gel content is calculated as follows from that part of a polymerizate which is insoluble in a solvent such as cyclohexanone or methylethylketone:

Gel Content (%) =

$$\frac{\text{Weight of undissolved substance (dried)}}{\text{Total weight of the polymerizate}} \times 100$$

Crosslinking of the product can be facilitated by adding up to approximately 20 percent by weight of a crosslinking agent during the polymerization of the monomer. As an alternative to this process, the cross-linking can be carried out following the manufacture of the polymerizate by heating, adding peroxides or other cross-linking agents, or by irradiation. Suitable cross-linking agents which are polymerized together with the simple olefinic unsaturated monomers include divinyl benzene, diallylmaleate, diallylfumarate, diallyladipate, allylacrylate, allylmethacrylate, diacrylate and dimethylacrylate or polyhydroxy alcohols such as ethylene glycol, dimethylacrylate, and other multiple olefinic unsaturated monomers.

In order to improve the carrying capacity of foamed polyurethanes, the composition of the homo- and copolymerizates is for instance chosen in such a manner that its glass temperature is at least at 40° C. or above.

In order to obtain particular properties, for instance, the applications which require high elasticity and simultaneously improve carrying capacity even at low temperature, graft polymerizates with two glass temperatures are used, the one glass temperature being below −20° C. and the other being above +40°.

The mixed graft polymerizates are produced by polymerizing graft monomers in the presence of the preformed graft base generally according to traditional graft polymerization methods. In the case of such graft polymerization reactions, the monomers are generally added to the preproduced rubber base and this mixture is polymerized in order to at least chemically bind or graft part of the mixed polymerizate to the rubber base.

The weight ratio of the graft base to the grafted monomers can vary between 90 to 10 to 10 to 90, preferably between 80 to 20 to 40 to 60.

Various crosslinkable rubbers to which the mixed polymerizate can be grafted are suitable as base for the grafted mixed polymerizate. These include the diene rubbers, acrylate rubbers, polyisoprene rubbers and mixtures thereof.

The preferred rubbers are diene rubbers or mixtures of diene rubbers, that is, all rubber-like polymerizates (that is, polymerizates with freezing temperatures of not more than −20° C. in accordance with ASTM test D-746-52 T) of one or more conjugated 1,3-dienes such as butadiene, isoprene, piperylene, chloroprene, and the like. Such rubbers include homopolymerizates and mixed polymerizates of conjugated 1,3-dienes with up to an equal amount by weight of one or more mixed polymerizable monoethylenically unsaturated monomers.

The already quoted monomers which by themselves result in polymerizates having a glass temperature of above +40° C. can be used as graft monomers.

For particular applications, it is very definitely possible to also use mixtures of graft polymerizates and homo- or copolymerizates having a glass temperature of about 40° C. Appropriately, the graft polymerizates to be used have a gel content of preferably above 30 percent.

Other aqueous polymer dispersions to be used in accordance with this invention are, for instance, described in the German Offenlegungschriften No. 24 57 727 and 25 08 582.

The aqueous polymer dispersions are used in quantities of 5 to 200, preferably in quantities from 20 to 100 percent by weight relative to the polyhydroxyl compound.

To manufacture the organic polymer polyol dispersions, the polyhydroxyl compound and the aqueous polymer dispersions are fed into a partially dehydrated circulated polymer polyol dispersion via separated feed lines and intensively mixed with the polymer polyol dispersion. The recycled circulating polymer polyol dispersion has a water content of 0.2 to 5 percent by weight, preferably of 0.2 to 2 percent by weight relative to the total weight. The weight ratio of introduced polyhydroxyl compound to introduced aqueous polymer dispersion can be varied within the limits of 1 to 0.5 to 1 to 2, preferably 1 to 0.2 to 1 to 1. The obtained reaction mixture is heated to the dehydration temperature of approximately 40° to 90° C., preferably 60° to 85° C. with the aid of heat exchangers. The water is separated under reduced pressure at approximately 5 to 150 millibar, preferably 20 to 75 millibar in commonly used equipment such as falling film or thin film evaporators.

The discharged polymer dispersion is dehydrated to a water content of 0.01 to 0.3 percent by weight, preferably of 0.04 to 0.1 percent by weight relative to the total weight, and preferably at least 1, preferably 1 to 2 in additional dehydration areas at a temperature of approximately 40° to 90° C., preferably of 60° to 85° C. and a pressure of 0.1 to 25 millibar, preferably of 1 to 10 millibar with the aid of commonly used equipment such as falling film or thin film evaporators.

A preferred model of the manufacturing process according to this invention is again explained in detail using the drawing.

The drawing figures stand for:
1. Heating medium feed line.
2. Heating medium drain line.
3. Circulation for partially dehydrated polymer polyol dispersion.
4. Feed line for polyhydroxyl compound.
5. Feed line for aqueous polymer dispersion.
6. Drain line for partially dehydrated polymer polyol dispersion.
7. Drain line for polymer polyol dispersion.
8. Discharge for water vapor and vacuum connection.
9. Metering pump for polyhydroxyl compound.
10. Metering pump for aqueous polymer dispersion.
11. Heat exchanger.
12. Mixing aggregate which may be heatable.
13. Pressure regulator.
14. Falling film evaporator.
15. Vapor separator.
16. Discharge pump for partially dehydrated polymer polyol dispersion.
17. Discharge pump for regulating the circulating and discharge quantity of partially dehydrated polymer polyol dispersions.
18. Falling film or thin film evaporator.
19. Vapor separator.
20. Discharge pump.
21. Cooler.

Via feed line (4) and metering pump (9), the polyhydroxyl compound is introduced into the circulation (3) of recirculated partially dehydrated polymer polyol dispersion and the mixture is heated to approximately 80° C. in the heat exchanger (11). Vacuum steam, for instance, is suitable heating medium. The heated mixture passes through a possibly heatable mixing aggregate (12) in which aqueous polymer dispersion is introduced via feed line (5) and metering pump (10). At this point, the viscosity of the mixture increases from 300 to 3,000 mPas to a maximum of 500 to 5,000 mPas as the reaction takes place. In order to prevent water from evaporating in the mixing unit (12)—this might result in coagulation of the dispersion—a pressure regulator (13) is inserted which is adjusted to a pressure equal to or greater than the water vapor pressure at the mixing temperature, for instance, to a pressure of 0.5 to 1.5 bar at 80° C. A mixture consisting of recycled polymer polyol dispersion, freshly added polyhydroxyl compound and freshly added aqueous polymer dispersion is released into the falling film evaporator (14) which is under a partial vacuum. The resulting liquid vapor mixture flows into the vapor separator (15) from where the water vapor is removed via separating line (8). The partially dehydrated polymer polyol dispersion having a water content of 0.2 to 5 percent by weight relative to the total weight and a viscosity of 300 to 3,000 mPas at 70° C. is discharged by means of the discharge pump (16) from the vapor separator (15) which is under partial vacuum, and with the aid of discharge pump (17) is separated into the circulating quantity and the discharge quantity. Via discharge pump (17) in drain line (6), the discharge quantity is transported into a storage vessel or in discharge line (6') to a falling film evaporator (18) with vapor separator (19) which is operated on a flow-through basis. At this point, at a temperature of approximately 80° C. and a pressure of 1 to 10 millibar, the water content of the polymer polyol dispersion is reduced to a value smaller than 0.3 percent by weight relative to the total weight. The resulting water vapor is separated via the off-line for water vapor and the vacuum connection (8) via line (7) and the discharge pump (20). The polymer polyol dispersion is discharged from the vapor separator (19) which is under partial vacuum and is cooled to room temperature in cooler (21).

The polymer polyol dispersions produced according to this invention have a water content of 0.2 to 5 percent by weight relative to the total weight and viscosities of 300 to 3,000 mPas at 70° C. depending on the type of the applied polyhydroxyl compound and the aqueous polymer dispersion.

The products are very well suited for the manufacture of polyurethane foams particularly flexible foams with a high compression factor such as automobile seats, upholstered furniture and so forth.

The process according to this invention is explained further by the following examples. The parts given in the examples are by weight unless otherwise indicated.

EXAMPLE 1

The process arrangement utilized is shown in the drawing.

13 Kilograms per hour of an organic polyhydroxyl compound having an average molecular weight of 4,800 and a hydroxyl number of 35 are added to 50 kilograms per hour of a partially dehydrated polymer polyol dispersion which is being recycled. The mixture is heated to 70° C. and is mixed with 6.5 kilograms per hour of a 50 percent by weight aqueous dispersion relative to the total weight of a copolymerizate produced from 95 parts of styrene, 5 parts of hydroxypropyl acrylate and 2 parts of divinyl benzene having a particle size of 150 nm with the aid of a mixing unit (12) at 1.4 bar. Ahead of the heated falling film evaporator (14), the pressure of the mixture is reduced to 30 millibar. This causes the water content of the polymer polyol dispersion to drop from 5.4 percent by weight to 0.3 percent by weight relative to the total weight and the viscosity (measured in the rotation viscosimeter at a shear rate of $D=0.1$ seconds$^{-1}$) at 70° C. from 4,000 to 2,500 mPas. 16.3 Kilograms of partially dehydrated polymer polyol dispersions are removed from the circulation via discharge pump (17) while 50 kilograms per hour circulate (ratio of circulating to discharge quantity 3.1 to 1). 3.2 Kilograms per hour of water vapor are removed from the vapor separator (15).

The discharged polymer polyol dispersions having a water content of 0.3 percent by weight is heated to 77° C. in the falling film evaporator (18) and is dehydrated to a water content of 0.08 percent by weight relative to the total weight at a reduced pressure of 4 millibar. The water vapor removed via discharge line (8) from the vapor separator (19) is condensed in a steam jet unit. The dehydrated polymer polyol dispersion is discharged via drain line (7), discharge pump (20) into cooler (21).

The maximum viscosity of 4,000 mPas resulting during the reaction is hardly above the viscosity of the end product of 2,500 mPas and far below the value of 50,000 mPas which results from the direct mixing of the polyhydroxyl compound and aqueous polymer dispersion at 70° C.

EXAMPLE 2

9 Kilograms per hour of the polyhydroxyl compound described in Example 1 are added to 250 kilograms per hour of a partially dehydrated polymer polyol dispersion which is being recycled, the mixture is heated to 70° C. and is mixed with 5.6 kilograms per hour of a 40 percent by weight aqueous dispersion relative to the total weight of a copolymerizate manufactured from 55 parts of acrylonitrile and 45 parts styrene having a particle size of 160 nm at 1 bar. Subsequently and ahead of the heated falling film evaporator (14), the pressure of the mixture is reduced to 20 millibar. This causes the water content of the polymer polyol dispersion to drop from 1.8 percent by weight to 0.6 percent by weight relative to the total weight and the viscosity at 70° C. from 1,600 to 400 mPas. 11.3 Kilograms per hour of partially dehydrated polymer polyol dispersion are discharged while 250 kilograms per hour are being recycled (ratio of recycle to discharge quantity being 22 to 1). 3.3 Kilograms per hour of water vapor is removed from the vapor separator (15) via drain line (8) and is precipitated in a condenser.

The discharged polymer polyol dispersion is dehydrated at 74° C. and at 2.5 millibar in a falling film evaporator (18) and vapor separator (19) to a water content of 0.25 percent by weight relative to the total weight.

The maximum viscosity of 1,600 mPas obtained during reaction is hardly above the viscosity of the final product of 400 mPas and far below the value of 100,000 mPas which would result from directly mixing the polyhydroxyl compound and the aqueous polymer dispersion at 70° C.

EXAMPLE 3

8 Kilograms per hour of an organic polyhydroxyl compound having an average molecular weight of 4,000 and a hydroxyl number of 28 is added to 50 kilograms per hour of a partially dehydrated polymer polyol dispersion which is being recycled and the mixture is heated to 80° C. and mixed with 4 kilograms per hour of an aqueous polymer dispersion according to Example 1 at 1 bar. Subsequently and ahead of the heated falling film evaporator (14), the pressure of the mixture is reduced to 17 millibar. This causes the water content of the polymer polyol dispersion to drop from 3.5 to 0.25 percent by weight relative to the total weight while the viscosity of 1,300 mPas at 80° C. remains constant. 10 Kilograms per hour of partially dehydrated polymer polyol dispersion is discharged whereas 50 kilograms per hour is recycled (ratio of circulating to discharged quantity is 5 to 1). 2 Kilograms per hour of water vapor is removed from the vapor separator (15).

The discharged polymer polyol dispersion is dehydrated at 84° C. and 1.5 millibar in the falling film evaporator (18) and vapor separator (19) to a water content of 0.1 percent by weight relative to the total weight.

The incurred maximum viscosity of 1,300 mPas corresponds with the viscosity of the end part product and is far below the value of 3,500,000 mPas which results from directly mixing the polyhydroxyl compound and the aqueous polymer dispersion at 80° C.

EXAMPLE 4

12 Kilograms per hour of an organic polyhydroxyl compound having an average molecular weight of 6,500 and a hydroxyl number of 26 are added to 50 kilograms per hour of partially dehydrated polymer polyol dispersion, the mixture is heated to 73° C. and is mixed with 6 kilograms per hour of an aqueous polymer dispersion according to Example 1 at 1.3 bar. Subsequently and ahead of the heated falling film evaporator (14), the pressure of the mixture is reduced to 23 millibar. This causes the water content of the polymer polyol dispersion to drop from 4.8 to 0.5 percent by weight relative to the total weight and the viscosity from 5,000 to 1,200 mPas at 73° C. 15 Kilograms per hour of partially dehydrated polymer polyol dispersion is discharged while 50 kilograms per hour is recycled (ratio of circulating to discharged quantity is 3.3 to 1), 3 kilograms per hour of water vapor is removed from the vapor separator (15).

The discharged polymer polyol dispersion is dehydrated to a water content of 0.06 percent by weight relative to the total weight at 80° C. and 5 millibar in the falling film evaporator (18) and vapor separator (19).

The incurred maximum viscosity of 5,000 mPas is hardly above the viscosity of the final product of 1,200 mPas and is far below the value of 4,500,000 mPas which results from directly mixing the polyhydroxyl compound and the aqueous polymer dispersion at 73° C.

The embodiments of the invention in which an exclusive property or privilege is claimed are defined as follows:

1. A process for the manufacture of organic polymer polyol dispersions from the polyhydroxyl compounds and aqueous polymer dispersions comprising the steps of
   mixing said polyhydroxyl compounds and said aqueous polymer dispersions in a reaction medium containing a recycled partially dehydrated organic polymer polyol dispersion wherein the weight ratio of said introduced polyhydroxyl compound to the introduced aqueous polymer dispersion is 1:05 to 1:2,
   removing water from the mixture in an amount sufficient to provide a water content of 0.2 to 5 percent by weight based on the total weight of the mixture,
   removing a portion of the organic polymer polyol dispersion obtained, and
   recycling the remaining portion of the organic polymer polyol dispersion obtained,
   with the weight ratio of the recycled organic polymer polyol dispersion to the removed organic polymer polyol dispersion being from 40:1 to 1:2.

2. Process for the manufacture of organic polymer polyol dispersions as defined in claim 1, wherein the mixture of partially dehydrated organic polymer polyol dispersion added to polyhydroxyl compound and aqueous polymer dispersion has a viscosity which is at least a factor of 10 smaller than the viscosity which would be obtained by directly mixing the polyhydroxyl compound and the aqueous polymer dispersion.

3. Process for the manufacture of organic polymer polyol dispersions as defined in claim 1, wherein the removed organic polymer polyol dispersion is dehydrated in at least one additional dehydration stage to a water content of 0.01 to 0.3 percent by weight.

* * * * *